US007000143B2

(12) United States Patent
Moulton et al.

(10) Patent No.: US 7,000,143 B2
(45) Date of Patent: Feb. 14, 2006

(54) SYSTEM AND METHOD FOR DATA PROTECTION WITH MULTIDIMENSIONAL PARITY

(75) Inventors: Gregory Hagan Moulton, Irvine, CA (US); Felix Hamilton, Irvine, CA (US); Jedidiah Yueh, Irvine, CA (US)

(73) Assignee: Avamar Technologies, Inc., Irvine, CA (US)

( * ) Notice: Subject to any disclaimer, the term of this patent is extended or adjusted under 35 U.S.C. 154(b) by 0 days.

(21) Appl. No.: 10/886,509

(22) Filed: Jul. 7, 2004

(65) Prior Publication Data

US 2005/0022052 A1 Jan. 27, 2005

Related U.S. Application Data

(63) Continuation of application No. 09/782,613, filed on Feb. 13, 2001, now Pat. No. 6,826,711.

(60) Provisional application No. 60/245,920, filed on Nov. 6, 2000, provisional application No. 60/183,762, filed on Mar. 18, 2000.

(51) Int. Cl.
*G06F 11/00* (2006.01)

(52) U.S. Cl. .......................... 714/6; 711/114

(58) Field of Classification Search .................. 714/6; 711/114
See application file for complete search history.

(56) References Cited

U.S. PATENT DOCUMENTS 6,351,838 B1 * 2/2002 Amelia ........................ 714/770
2002/0059539 A1 * 5/2002 Anderson ....................... 714/6

* cited by examiner

*Primary Examiner*—Scott Baderman
(74) *Attorney, Agent, or Firm*—Stuart T. Langley; William J. Kubida; Hogan & Hartson LLP (57) ABSTRACT

A high availability, high reliability storage system that leverages rapid advances in commodity computing devices and the robust nature of internetwork technology such as the Internet. A system of parity distribution in accordance with the present invention allows for greater fault tolerance and levels of storage efficiency than possible with conventional RAID (levels 0–5) paradigms. Data can be recovered or made available even in the case of loss of N, N+1, or more devices or storage elements over which stripes of the data set have been distributed or partitioned. The present invention provides a parity distribution that can be used to distribute data stored in a single storage device or across multiple connected or otherwise networked devices

5 Claims, 9 Drawing Sheets

SYSTEM AND METHOD FOR DATA PROTECTION WITH MULTIDIMENSIONAL PARITY

CROSS REFERENCE TO RELATED PATENT APPLICATIONS

The present invention is a continuation of U.S. Ser. No. 09/782,613, now U.S. Pat. No. 6,826,711, filed on Feb. 13, 2001 which claims the benefit of U.S. Provisional Patent Application Ser. No. 60/183,762 for: "System and Method for Decentralized Data Storage" filed Feb. 18, 2000, and U.S. Provisional Patent Application Ser. No. 60/245,920 filed Nov. 6, 2000 entitled "System and Method for Decentralized Data Storage" the disclosures of which are herein specifically incorporated by this reference.

BACKGROUND OF THE INVENTION

1. Field of the Invention

The present invention relates, in general, to network data storage, and, more particularly, to software, systems and methods for high availability, high reliability data storage using parity data protection having an arbitrary dimensionality.

2. Relevant Background

Economic, political, and social power are increasingly managed by data. Transactions and wealth are represented by data. Political power is analyzed and modified based on data. Human interactions and relationships are defined by data exchanges. Hence, the efficient distribution, storage, and management of data is expected to play an increasingly vital role in human society.

The quantity of data that must be managed, in the form of computer programs, databases, files, and the like, increases exponentially. As computer processing power increases, operating system and application software becomes larger. Moreover, the desire to access larger data sets such as those comprising multimedia files and large databases further increases the quantity of data that is managed. This increasingly large data load must be transported between computing devices and stored in an accessible fashion. The exponential growth rate of data is expected to outpace improvements in communication bandwidth and storage capacity, making the need to handle data management tasks using conventional methods even more urgent.

High reliability and high availability are increasingly important characteristics of data storage systems as data users become increasingly intolerant of lost, damaged, and unavailable data. Data storage mechanisms ranging from volatile random access memory (RAM), non-volatile RAM, to magnetic hard disk and tape storage, as well as others, are subject to component failure. Moreover, the communication systems that link users to the storage mechanisms are subject to failure, making the data stored behind the systems temporarily or permanently unavailable. Varying levels of reliability and availability are achieved by techniques generally referred to as "parity".

Parity storage, as used herein, refers to a variety of techniques that are utilized to store redundant information, error correcting code (ECC), and/or actual parity information (collectively referred to as "parity information") in addition to primary data (i.e., the data set to be protected). The parity information is used to access or reconstruct primary data when the storage devices in which the primary data is held fail or become unavailable.

Parity may be implemented within single storage devices, such as a hard disk, to allow recovery of data in the event a portion of the device fails. For example, when a sector of a hard disk fails, parity enables the information stored in the failed sector to be recreated and stored at a non-failed sector. Some RAM implementations use ECC to correct memory contents as they are written and read from memory.

Redundant array of independent disks (RAID) technology has developed in recent years as a means for improving storage reliability and availability. The concept, as initially conceived, contemplated the clustering of small inexpensive hard disks into an array such that the array would appear to the system as a single large disk. Simple arrays, however, actually reduced the reliability of the system to that of the weakest member. In response, a variety of methods (i.e., RAID technology) for storing data throughout the array in manners that provided of redundancy and/or parity were developed to provide varying levels of data protection.

Conventional RAID (redundant array of independent disks) systems provide a way to store the same data in different places (thus, redundantly) on multiple storage devices such as hard disk drives. By placing data on multiple disks, input/output (I/O) operations can overlap in a balanced way, distributing the load across disks in the array and thereby improving performance. Since using multiple disks in this manner increases the mean time between failure (MTBF) for the system as a whole with respect to data availability, storing data redundantly also increases fault-tolerance. A RAID system relies on a hardware or software controller to hide the complexities of the actual data management so that RAID systems appear to an operating system to be a single logical volume. However, RAID systems are difficult to scale because of physical limitations on the cabling and controllers. Also, RAID systems are highly dependent on the controllers so that when a controller fails, the data stored behind the controller becomes unavailable. Moreover, RAID systems require specialized, rather than commodity hardware, and so tend to be expensive solutions.

RAID solutions are also relatively expensive to maintain, as well as difficult and time consuming to properly configure. RAID systems are designed to enable recreation of data on a failed disk or controller but the failed disk must be replaced to restore high availability and high reliability functionality. Until replacement occurs, the system is vulnerable to additional device failures. Condition of the system hardware must be continually monitored and maintenance performed as needed to maintain functionality. Hence, RAID systems must be physically situated so that they are accessible to trained technicians who can perform required maintenance. Not only are the man-hours required to configure and maintain a RAID system expensive, but since most data losses are due to human error, the requirement for continual human monitoring and intervention decreases the overall reliability of such a system. This limitation also makes it difficult to set up a RAID system at a remote location or in a foreign country where suitable technicians would have to be found and/or transported to the locale in which the RAID equipment is installed to perform maintenance functions.

RAID systems (levels 0–5) cannot be expanded in minimal increments (e.g. adding a single storage element) while the system is in operation. The addition of a storage element requires that the entire system be brought down, parity recalculated, and then data restored. Hence, expanding the capacity addressed by RAID systems may result in data unavailability for indefinite amounts of time.

Moreover, RAID systems cannot scope levels of parity protection differently for arbitrarily small subsets of data within the overall data set protected. A RAID controller is configured to provide one type of parity protection at a time on a fixed, known set of storage devices. However, different types of data have very different and highly varied protection requirements. Mission critical data may need an extremely high level of protection, whereas data such as program files and seldom used documents may need little or no protection at all. Currently, users must either implement multiple systems to provide varying levels of protection to different types of data, or compromise their data protection needs by either paying too much to protect non-critical data, or by providing less than desired protection for critical data.

Current RAID systems do not provide a practical method by which parity data can be used not only to reconstruct primary data but also to serve data requests in lieu of or in addition to serving those requests directly from the primary data itself. With the exception of mirrored data protection systems, parity information is generally used in the event of a catastrophe to serve requests for lost data only while the primary data is being reconstructed from this parity information. After reconstruction of the primary data, data is once again served from the reconstructed primary only, not the parity information. This increases the effective overhead cost of parity data, as parity information is only passively stored by the storage system rather than actively being used to improve performance during normal operation.

NAS (network-attached storage) refers to hard disk storage that is set up with its own network address rather than being attached to an application server. File requests are mapped to the NAS file server rather than being routed through an application server device. NAS may perform I/O operations using RAID internally (i.e., within a NAS node). NAS may also automate mirroring of data to one or more other NAS devices to further improve fault tolerance. This mirroring may be done synchronously or asynchronously, but in both cases network limitations provide range restrictions on geographic separation. Because NAS devices can be added to a network, they may enable some scaling of the aggregate network storage capacity by adding additional NAS nodes. However, NAS devices are constrained in RAID applications to the abilities provided by conventional hardware and software based RAID controllers. NAS systems do not generally enable mirroring and parity across nodes, and so any single point of failure at a typical NAS node makes all of the data stored at that NAS node unavailable. RAID systems are not designed to provide efficient, redundant, and fault tolerant data storage in distributed network data storage environments.

In general, current parity protection systems provide one-dimensional parity protection, with some systems providing up to two-dimensional parity protection. One-dimensional parity protection means that one set of parity information is created and maintained for a given primary data set. Hence, the system is vulnerable to simultaneous failure of primary data storage and the associated parity data storage. RAID level 6 provides two-dimensional parity using two independent, distributed parity groups. However, there remains a need for systems and methods for efficiently providing greater dimensions, and preferably arbitrarily large dimensions of parity protection.

Philosophically, the way data is conventionally managed is inconsistent with the hardware devices and infrastructures that have been developed to manipulate and transport data. For example, computers are characteristically general-purpose machines that are readily programmed to perform a virtually unlimited variety of functions. In large part, however, computers are loaded with a fixed, slowly changing set of data that limits their general-purpose nature to make the machines special-purpose. Advances in processing speed, peripheral performance and data storage capacity are most dramatic in commodity computers and computer components. Yet many data storage solutions cannot take advantage of these advances because they are constrained rather than extended by the storage controllers upon which they are based. Similarly, the Internet was developed as a fault tolerant, multi-path interconnection. However, network resources are conventionally implemented in specific network nodes such that failure of the node makes the resource unavailable despite the fault-tolerance of the network to which the node is connected. Continuing needs exist for highly available, highly reliable, and highly scaleable data storage solutions.

SUMMARY OF THE INVENTION

Briefly stated, the present invention involves a data storage system implementing an N-dimensional parity paradigm. A system for parity distribution is preferably implemented in a distributed network storage environment, but may also be implemented in a conventional storage array or a single storage device environment. A mechanism for the dynamic addition and subtraction of storage elements as well as the capability to dynamically modify the degree of redundancy protection enjoyed by individual data elements and sets of elements in an arbitrary way is provided.

In another aspect, the present invention involves a method for data protection with an arbitrary number of parity dimensions in which a data element is selected for entry and a degree of fault tolerance desired for that data element is determined. A number of non-intersecting parity groups (i.e., where no two members of a single parity group reside on the same physical device) are associated with the primary data element from an arbitrarily large pool of available storage locations which reside on an arbitrary number of physical storage devices. A location for the primary data element to be stored is selected based on user-specified or system-specified metrics. The data element is written to its primary location and the parity elements associated with the previously chosen parity groups are updated. Once the primary write operation and associated parity updates are confirmed, the data entry transaction is finalized. System read operations either read the data element directly from its primary location or read an image of the data element reconstructed from one or more of its associated parity groups. The criteria on which this choice is based are arbitrary, but generally performance related. The process by which primary data elements and the parity elements associated with the logical parity groups to which the primary data belongs are maintained, migrated, and reconstructed due to network, server, disk, and human error is preferably automated and fully dynamic.

DETAILED DESCRIPTION OF THE PREFERRED EMBODIMENTS

The present invention is directed to a high availability, high reliability storage system that leverages rapid advances in commodity computing devices and the robust nature of internetwork technology such as the Internet. A system of parity distribution in accordance with the present invention allows for greater fault tolerance and levels of storage efficiency than possible with conventional RAID (levels 0–5) paradigms. Data can be recovered or made available even in the case of loss of N, N+1, or more devices or storage elements over which stripes of the data set have been distributed or partitioned. The present invention provides a parity distribution that can be used to distribute data stored in a single storage device or across multiple connected or otherwise networked devices.

In general, the present invention provides a parity system, herein called "N-dimensional parity", in which a primary data set can be protected with an arbitrarily large number of parity dimensions whose size is arbitrarily configurable. N-dimensional parity permits several points of failure without loss of data. As a result, failure or unavailability of any particular primary storage device, parity storage device, or set of parity storage devices will not affect the system's ability to reconstruct and serve the primary data set stored in the system. In some embodiments, data requests are served directly from the parity information rather than the primary data even when the primary data is available, thereby reducing the effective overhead of maintaining parity as well as increasing overall system performance.

In general, preferred embodiments of the present invention involve a redundant array of independent nodes (RAN) distributed throughout a network topology. Nodes may be located on local area networks (LANs), metropolitan area networks (MAN), wide area networks (WANs), or any other network having spatially distanced nodes. Nodes are preferably internetworked using mechanisms such as the Internet. In specific embodiments, at least some nodes are publicly accessible for data access requests through public networks such as the Internet and nodes communicate with each other by way of private networks and/or virtual private networks, which may themselves be implemented using Internet resources.

Significantly, the nodes implement not only storage capacity and read/write operations, but sufficient intelligence to communicate with each other and manage not only their own storage, but storage on other nodes. For example, storage nodes maintain state information describing other storage nodes capabilities, connectivity, capacity, and the like. Also, storage nodes may be enabled to cause storage functions such as read/write functions to be performed on other storage nodes. Traditional storage systems do not allow peer-to-peer type information sharing amongst the storage devices themselves. In contrast, the present invention enables peer-to-peer information exchange and, as a result, implements a significantly more robust system than that provided by conventional systems that is, in addition, highly scaleable. The system is scaleable because, among other reasons, most storage tasks can be implemented in parallel by multiple storage devices. The system is robust because the storage nodes can be globally distributed—making the system immune to events in any one or more geographical, political, or network topological locations.

The present invention is implemented in a globally distributed storage system involving storage nodes that are optionally managed by distributed storage allocation management (SAM) processes. The present invention is directed to the architecture and implementation of the parity mechanisms within the storage nodes, and so is not limited to use with the particular SAM processes or RAIN storage devices disclosed in the exemplary embodiments. SAM and RAIN systems are good examples of a storage architecture that can be dynamically expanded to allow for incremental changes in storage capacity as well as the location and performance of storage capacity. However, the exemplary SAM processes and RAIN storage devices are discussed to the extent they illustrate the performance of the storage node architecture of the present invention.

The nodes are connected to a network and data is preferably distributed across the nodes in a multi-level, fault-tolerant fashion. In contrast to conventional RAID systems, the present invention enables mirroring and parity operations to be spread across nodes rather than simply across hard drives within a single node. Nodes can be dynamically added to and removed from the system while the data managed by the system remains available. In this manner, the system of the present invention avoids single or multiple failure points in a manner that is orders of magnitude more robust than conventional RAID systems.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments as well as small network environments such as conventional LANs. Similarly, essential teachings of the present invention can be implemented in different portions of a single storage device or a portion of a storage device.

Figure 1:
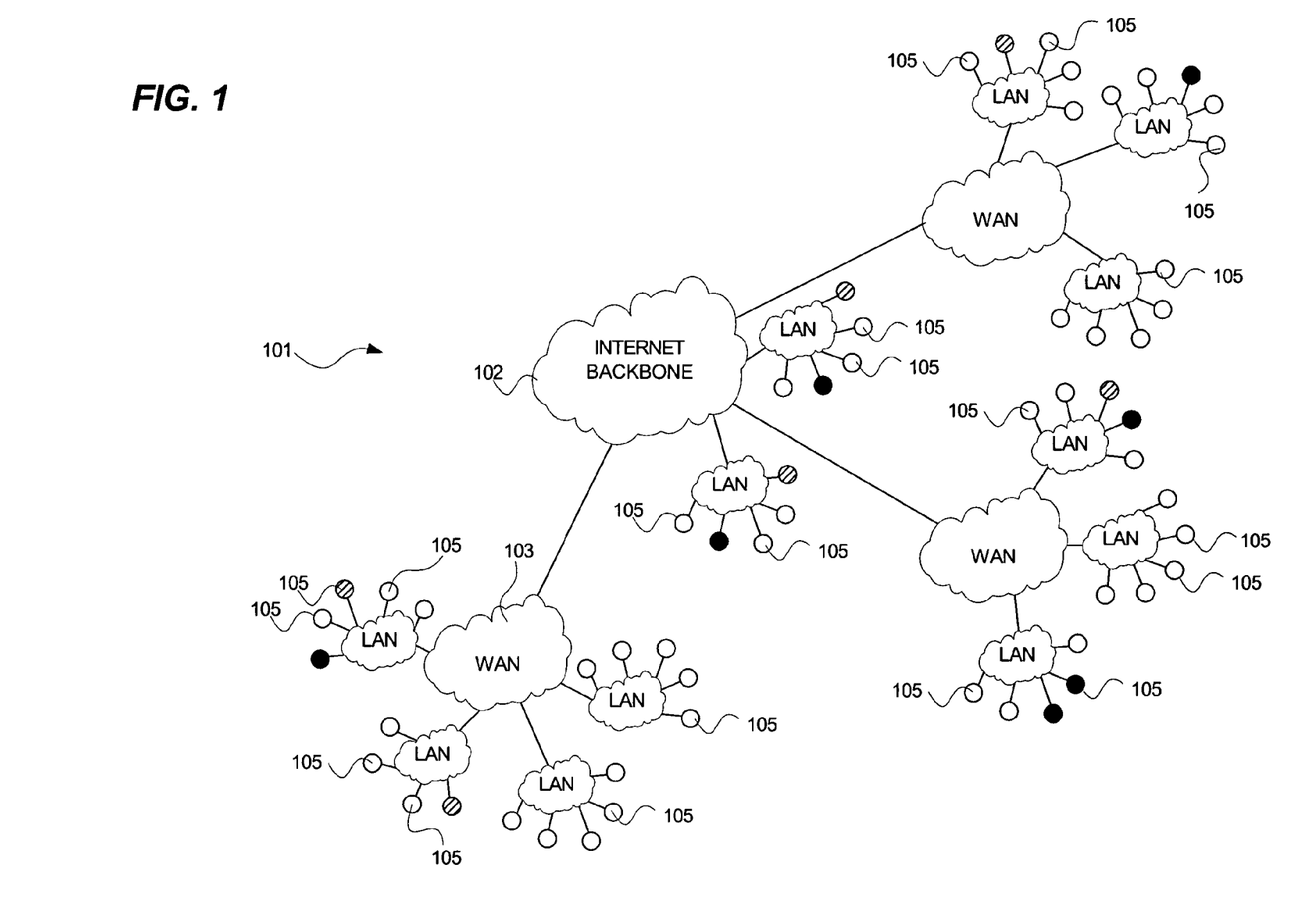
FIG. 1 shows a networked computer environment in which the present invention is implemented.

The present invention is directed to data storage on a network 101 shown in FIG. 1. FIG. 1 shows an exemplary internetwork environment 101 such as the Internet. The Internet is a global internetwork formed by logical and physical connections between multiple wide area networks (WANs) 103 and local area networks (LANs) 104. An Internet backbone 102 represents the main lines and routers that carry the bulk of the traffic. The backbone is formed by the largest networks in the system that are operated by major Internet service providers (ISPs) such as GTE, MCI, Sprint, UUNet, and America Online, for example. While single connection lines are used to conveniently illustrate WAN 103 and LAN 104 connections to the Internet backbone 102, it should be understood that in reality multi-path, routable wired and/or wireless connections exist between multiple WANs 103 and LANs 104. This makes internetwork 101 robust when faced with single or multiple points of failure.

It is important to distinguish network connections from internal data pathways implemented between peripheral devices within a computer. A "network" comprises a system of general purpose, usually switched, physical connections that enable logical connections between processes operating on storage nodes 105. The physical connections implemented by a network are typically independent of the logical connections that are established between processes using the network. In this manner, a heterogeneous set of processes ranging from file transfer to mail transfer and the like can use the same physical network. Conversely, the network can be formed from a heterogeneous set of physical network technologies that are transparent to the logically connected processes using the network. Because the logical connection between processes implemented by a network is independent of the physical connection, internetworks are readily scaled to a virtually unlimited number of nodes over long distances.

In contrast, internal data pathways such as a system bus, Peripheral Component Interconnect (PCI) bus, Intelligent Drive Electronics (IDE) bus, Small Computer System Interface (SCSI) bus, Fibre Channel, and the like define physical connections that implement special-purpose connections within a computer system. These connections implement physical connections between physical devices as opposed to logical connections between processes. These physical connections are generally characterized by a limited distance between components, a limited number of devices that can be coupled to the connection, and constrained format of devices that can be connected over the connection.

To generalize the above discussion, the term "network" as it is used herein refers to a means enabling a physical and logical connection between devices that 1) enables at least some of the devices to communicate with external sources, and 2) enables the devices to communicate with each other. It is contemplated that some of the internal data pathways described above could be modified to implement the peer-to-peer style communication of the present invention, however, such functionality is not currently available in commodity components. Moreover, such modification, while useful, would fail to realize the full potential of the present invention as storage nodes implemented across, for example, a SCSI bus would inherently lack the level of physical and topological diversity that can be achieved with the present invention.

Referring again to FIG. 1, the present invention is implemented by placing storage devices at storage nodes 105. The storage devices at any storage node 105 may comprise a single hard drive, may comprise a managed storage system such as a conventional RAID device having multiple hard drives configured as a single logical volume, or may comprise any reasonable hardware configuration spanned by these possibilities. Significantly, the present invention manages redundancy operations across nodes, as opposed to within nodes, so that the specific configuration of the storage within any given node can be varied significantly without departing from the present invention.

Optionally, one or more nodes 105 implement storage allocation management (SAM) processes that manage data storage across multiple nodes 105 in a distributed, collaborative fashion. SAM processes may be implemented in a centralized fashion within special-purpose nodes 105. Alternatively, SAM processes are implemented within some or all of storage nodes 105. The SAM processes communicate with each other and handle access to the actual storage devices within any particular storage node 105. The capabilities, distribution, and connections provided by the storage nodes 105 in accordance with the present invention enable storage processes (e.g., SAM processes) to operate with little or no centralized control for the system as whole.

In a particular implementation, SAM processes provide data distribution across storage nodes 105 and implement recovery in a fault-tolerant fashion across network nodes 105 in a manner similar to paradigms found in RAID storage subsystems. However, because SAM processes operate across nodes rather than within a single node or within a single computer, they allow for arbitrarily large dimensions of parity—thereby providing a storage system with "n-dimensional" parity. Moreover, it is not simply that the SAM processes operate across network nodes, but also that SAM processes are themselves distributed in a highly parallel and redundant manner, especially when implemented within some or all of storage nodes 105. By way of this distribution of functionality as well as data, failure of any node or group of nodes will be much less likely to affect the overall availability of stored data.

For example, SAM processes can recover even when a network node 105, LAN 104, or WAN 103 becomes unavailable. Moreover, even when a portion of the Internet backbone 102 becomes unavailable through failure or congestion the SAM processes can recover using data distributed on nodes 105 and functionality that is distributed on the various SAM nodes 106 that remain accessible. In this manner, the present invention leverages the robust nature of internetworks to provide unprecedented availability, reliability, and robustness.

Dynamically selected sets of storage nodes 105 are logically associated to form parity groups as suggested by the cross-hatched and solid-filled ones of nodes 105 in FIG. 1. Parity groups are distributed across different geography, network topology, political boundaries, and the like to provide a kind of data protection not possible with conventional RAID-like storage.

FIG. 1 may suggest that each member of a parity group is an entire storage node 105, which is possible, but not required. Each storage node 105 comprises a number of storage areas. Each storage area can be roughly equated to the storage capacity required to store a stripe of data or parity associated with a data set. In most implementations it is contemplated that parity group members comprise storage areas, not entire storage nodes 105. Data or parity information is stored in the storage area, and any given storage node may hold data/parity from a number of data sets in its various storage areas. Conversely, each member of a parity group may comprise multiple nodes 105 where the size of a storage area is greater than the capacity of a single node 105. A parity group is defined by the selection of storage areas from various storage nodes that are logically combined to generate parity information that is stored in another storage area.

Parity groups are formed by sets of storage nodes 105, or more specifically, by data structures within selected nodes 105. The size of a parity group is determined by the number of stripes (i.e., storage areas) that are associated with a set of parity information. Cross-hatched nodes 105 suggest a first parity group and solid-filled nodes 105 suggest a second, independent or non-intersecting parity group. A non-intersecting parity groups refers to groups in which no two members of a single parity group reside on the same physical device. A given data set is stored across an arbitrary number of parity groups of varying size according to a specified parity scheme to achieve the desired level of protection for the data set. In accordance with the present invention, some or all of the members of the parity group are used to store the actual data set (e.g., primary data) and some or all of the members are members of the parity group are used to store parity information. In an alternative embodiment, the parity group members are used to store only parity information, not the primary data set, so that any k parity members are sufficient to reconstruct the primary data set, but that k−1 pieces give NO information about the primary data set.

One feature of the present invention is that the membership in any parity group can be dynamically determined. Similarly, the number of storage nodes 105 in a parity group can be dynamically increased or decreased to meet instantaneous needs. Moreover, a data set in a given parity group can be dynamically added to another parity group. The flexibility provided by the present invention enables greater control over and manipulation of data protection than has been possible with conventional data mirroring or RAID-type protections. For example, data can be protected using multiple cost/speed arrangements. Small parity groups are faster to reconstruct and read data from, but expensive. Large parity groups conserve space, but have high communication overhead during reconstruction. The dynamic configuration capabilities provided by the present invention provide a method for efficiently and economically providing multiple levels of data protection so that users can select the level of data protection enjoyed by various data sets.

Parity reconstruction can also be used as an alternative source for data even when faults have not occurred. Parity effectively offers a second source for data. N-dimensional parity offers multiple alternative sources for data including mirror copies and parity information. In complex systems it is contemplated that there can be situations in which it is faster to reconstruct data from its associated parity information than to read it from a non-parity (e.g., primary) source. Because the present invention allows data requests for a primary data set to be reconstructed and served from one or more of the parity groups it is associated with even when that primary data is available, performance can even further be enhanced by establishing a large number of small parity groups for data sets under a high transaction load. For example, in a network storage system, the resource holding non-parity versions of requested data may be less desirable to access than the same data reconstructed from parity information. This may be because the resource is currently operating under high load, at a topologically distant location, or has other undesirable characteristics.

Figure 2:
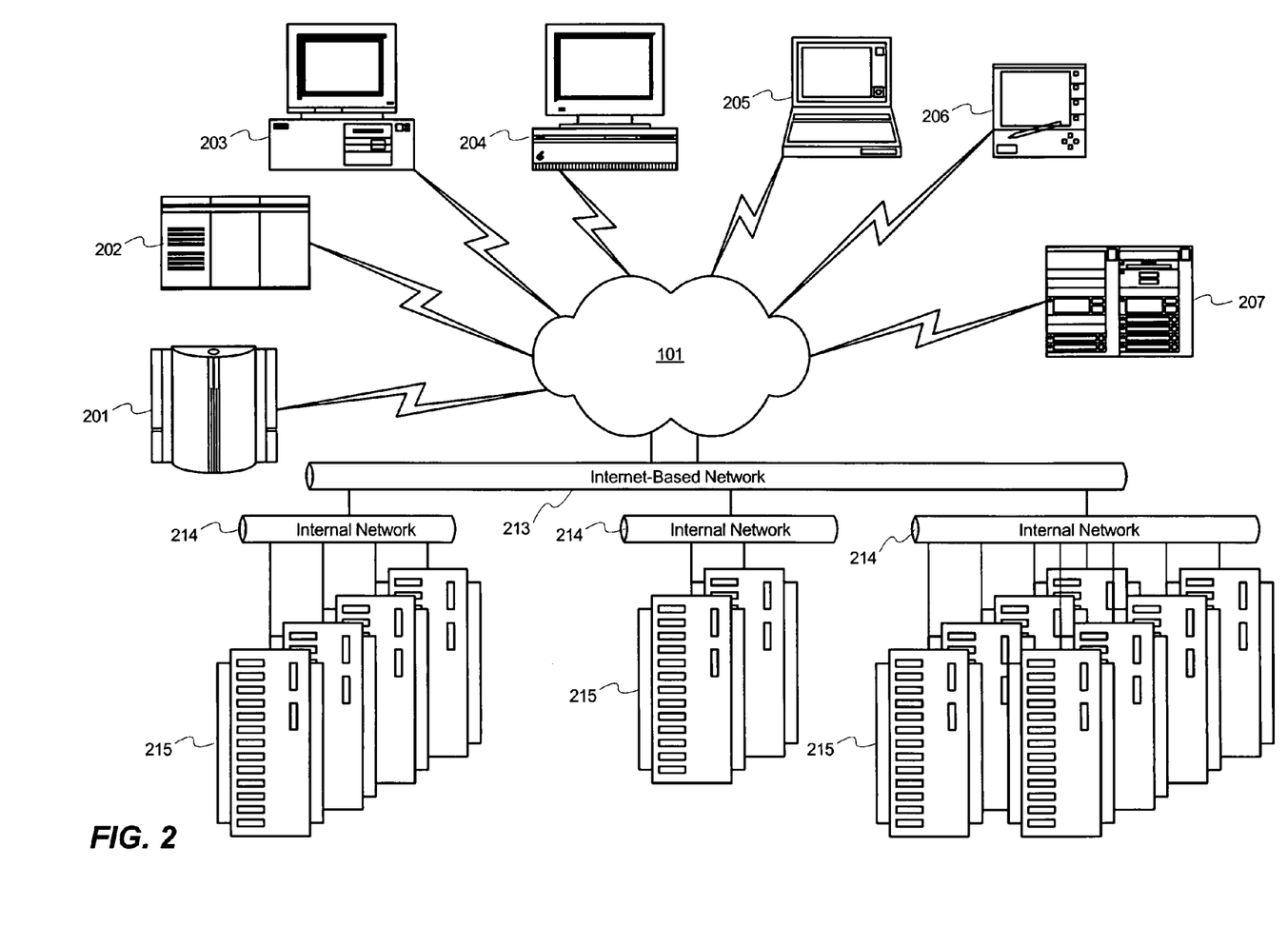
FIG. 2 shows a computing environment in which the present invention is implemented at a different level of detail.

FIG. 2 shows an alternate view of an exemplary network computing environment in which the present invention is implemented. Internetwork 101 enables the interconnection of a heterogeneous set of computing devices and mechanisms ranging from a supercomputer or data center 201 to a hand-held or pen-based device 206. While such devices have disparate data storage needs, they share an ability to retrieve data via network 101 and operate on that data using their own resources. Disparate computing devices including mainframe computers (e.g., VAX station 202 and IBM AS/400 station 208) as well as personal computer or workstation class devices such as IBM compatible device 203, Macintosh device 204 and laptop computer 205 are easily interconnected via internetwork 101. The present invention also contemplates wireless device connections to devices such as cell phones, laptop computers, pagers, hand held computers, and the like.

Internet-based network 213 comprises a set of logical connections, some of which are made through internetwork 101, between a plurality of internal networks 214. Conceptually, Internet-based network 213 is akin to a WAN 103 in that it enables logical connections between spatially distant nodes. Internet-based networks 213 may be implemented using the Internet or other public and private WAN technologies including leased lines, Fibre Channel, frame relay, and the like.

Similarly, internal networks 214 are conceptually akin to LANs 104 shown in FIG. 1 in that they enable logical connections across more limited distances than those allowed by a WAN 103. Internal networks 214 may be implemented using LAN technologies including Ethernet, Fiber Distributed Data Interface (FDDI), Token Ring, Appletalk, Fibre Channel, and the like.

Each internal network 214 connects one or more RAIN elements 215 to implement RAIN nodes 105. RAIN elements 215 illustrate an exemplary instance of a hardware/software platform that implements a RAIN node 105. Conversely, a RAIN node 105 refers to a more abstract logical entity that illustrates the presence of the RAIN functionality to external network users. Each RAIN element 215 comprises a processor, memory, and one or more mass storage devices such as hard disks. RAIN elements 215 also include hard disk controllers that may be conventional EIDE or SCSI controllers, or may be managing controllers such as RAID controllers. RAIN elements 215 may be physically dispersed or co-located in one or more racks sharing resources such as cooling and power. Each node 105 is independent of other nodes 105 in that failure or unavailability of one node 105 does not affect availability of other nodes 105, and data stored on one node 105 may be reconstructed from data stored on other nodes 105.

The perspective provided by FIG. 2 is highly physical and it should be kept in mind that physical implementation of the present invention may take a variety of forms. The multi-tiered network structure of FIG. 2 may be altered to a single tier in which all RAIN nodes 105 communicate directly with the Internet. Alternatively, three or more network tiers may be present with RAIN nodes 105 clustered behind any given tier. A significant feature of the present invention is that it is readily adaptable to these heterogeneous implementations.

Figure 3:
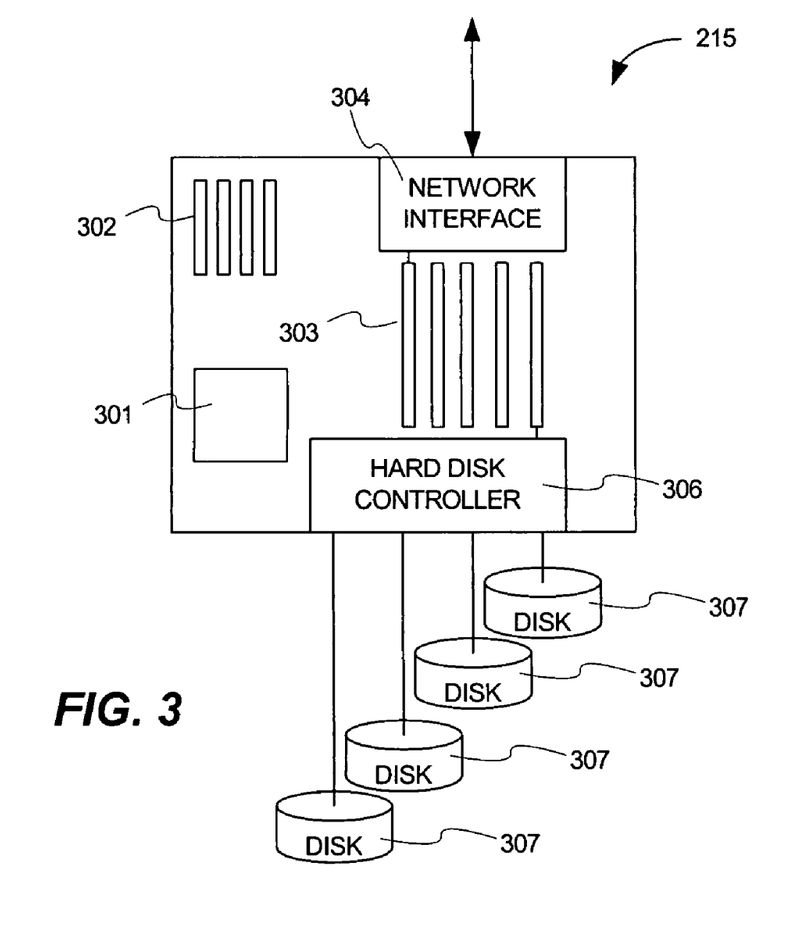
FIG. 3 illustrates components of a RAIN element in accordance with an embodiment of the present invention.

RAIN elements 215 are shown in greater detail in FIG. 3. In a particular implementation, RAIN elements 215 comprise computers using commodity components such as Intel-based microprocessors 301 mounted on a motherboard supporting a PCI bus 303 and 128 megabytes of random access memory (RAM) 302 housed in a conventional AT or ATX case. SCSI or IDE controllers 306 may be implemented on the motherboard and/or by expansion cards connected to the PCI bus 303. Where the controllers 306 are implemented only on the motherboard, a PCI expansion bus 303 is optional. In a particular implementation, the motherboard implements two mastering EIDE channels and an PCI expansion card is used to implement two additional mastering EIDE channels so that each RAIN element 215 includes up to four EIDE hard disks 307. In the particular implementation, each hard disk 307 comprises an 80 gigabyte hard disk for a total storage capacity of 320 gigabyte per RAIN element 215. The casing also houses supporting mechanisms such as power supplies and cooling devices (not shown).

The specific implementation discussed above is readily modified to meet the needs of a particular application. Because the present invention uses network methods to communicate with the storage nodes, the particular implementation of the storage node is largely hidden from the devices using the storage nodes, making the present invention uniquely receptive to modification of node configuration and highly tolerant of systems comprised by heterogeneous storage node configurations. For example, processor type, speed, instruction set architecture, and the like can be modified and may vary from node to node. The hard disk capacity and configuration within RAIN elements 215 can be readily increased or decreased to meet the needs of a particular application. Although mass storage is implemented using magnetic hard disks, other types of mass storage devices such as magneto-optical, optical disk, digital optical tape, holographic storage, atomic force probe storage and the like can be used as suitable equivalents as they become increasingly available. Memory configurations including RAM capacity, RAM speed, RAM type (e.g., DRAM, SRAM, SDRAM) can vary from node to node making the present invention incrementally upgradeable to take advantage of new technologies and component pricing. Network interface components may be provided in the form of expansion cards coupled to a mother board or built into a mother board and may operate with a variety of available interface speeds (e.g., 10 BaseT Ethernet, 100 BaseT Ethernet, Gigabit Ethernet, 56K analog modem) and can provide varying levels of buffering, protocol stack processing, and the like.

Specifically, it is contemplated that the processing power, memory, network connectivity and other features of the implementation shown in FIG. 3 could be integrated within a disk drive controller and actually integrated within the housing of a disk drive itself. In such a configuration, a RAIN element 215 might be deployed simply by connecting such an integrated device to an available network, and multiple RAIN elements 215 might be housed in a single physical enclosure.

Each RAIN element 215 may execute an operating system. The particular implementations use a UNIX operating system (OS) or UNIX-variant OS such as Linux. It is contemplated, however, that other operating systems including DOS, Microsoft Windows, Apple Macintosh OS, OS/2, Microsoft Windows NT and the like may be equivalently substituted with predictable changes in performance. Moreover, special purpose lightweight operating systems or micro kernels may also be used, although cost of development of such operating systems may be prohibitive. The operating system chosen implements a platform for executing application software and processes, mechanisms for accessing a network, and mechanisms for accessing mass storage. Optionally, the OS supports a storage allocation system for the mass storage via the hard disk controller(s).

Various application software and processes can be implemented on each RAIN element 215 to provide network connectivity via a network interface 304 using appropriate network protocols such as User Datagram Protocol (UDP), Transmission Control Protocol (TCP), Internet Protocol (IP), Token Ring, Asynchronous Transfer Mode (ATM), and the like.

In the particular embodiments, the data stored in any particular node 105 can be recovered using data at one or more other nodes 105 using data recovery and storage management processes. These data recovery and storage management processes preferably execute on a node 106 and/or on one of the nodes 105 separate from the particular node 105 upon which the data is stored. Conceptually, storage management is provided across an arbitrary set of nodes 105 that may be coupled to separate, independent internal networks 215 via internetwork 213. This increases availability and reliability in that one or more internal networks 214 can fail or become unavailable due to congestion or other events without affecting the overall availability of data.

In an elemental form, each RAIN element 215 has some superficial similarity to a network attached storage (NAS) device. However, because the RAIN elements 215 work cooperatively, the functionality of a RAIN system comprising multiple cooperating RAIN elements 215 is significantly greater than a conventional NAS device. Further, each RAIN element preferably supports data structures that enable parity operations across nodes 105 (as opposed to within nodes 105). These data structures enable operation akin to RAID operation, however, because the RAIN operations are distributed across nodes and the nodes are logically, but not necessarily physically connected, the RAIN operations are significantly more fault tolerant and reliable than conventional RAID systems.

Figure 4:
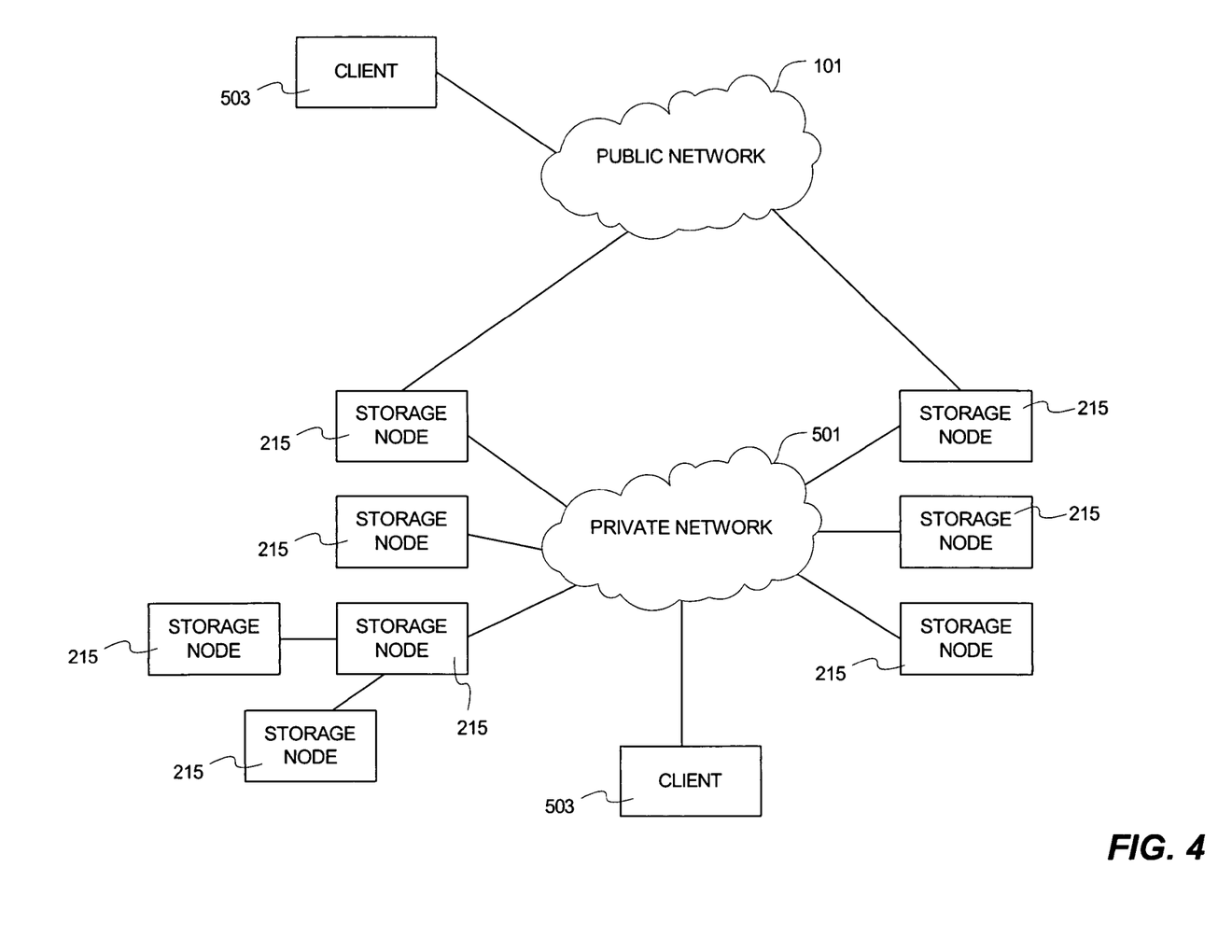
FIG. 4 illustrates entity relationships between various entities in a specific embodiment of the present invention.

FIG. 4 shows an exemplary storage system in accordance with the present invention from another perspective. Client 503 represents any of a number of network appliances that may use the storage system in accordance with the present invention. Client 503 uses a file system or other means for generating storage requests directed to one of accessible storage nodes 215. Not all storage nodes 215 need to be accessible through Internet 101. In one implementation, client 503 makes a storage request to a domain name using HyperText Transport Protocol (HTTP), Secure HyperText Transport Protocol (HTTPS), File Transfer Protocol (FTP), or the like. In addition to or instead of client 503 coupling through a public network 101, a client 503 may be connected to the private network 501 to access the storage device(s). The Internet Domain Name System (DNS) will resolve the storage request to a particular IP address identifying a specific storage node 215 that implements the SAM processes. Client 503 then directs the actual storage request using a mutual protocol to the identified IP address.

The storage request is directed using network routing resources to a storage node 215 assigned to the IP address. This storage node then conducts storage operations (i.e., data read and write transactions) on mass storage devices implemented in the storage node 215, or on any other storage node 215 that can be reached over an explicit or virtual private network 501. Some storage nodes 215 may be clustered as shown in the lower left side of FIG. 4., and clustered storage nodes may be accessible through another storage node 215.

Preferably, all storage nodes are enabled to exchange state information via private network 501. Private network 501 is implemented as a virtual private network over Internet 101 in the particular examples. In the particular examples, each storage node 215 can send and receive state information. However, it is contemplated that in some applications some storage nodes 215 may need only to send their state information while other nodes 215 act to send and receive storage information. System state information may be exchanged universally such that all storage nodes 215 contain a consistent set of state information about all other storage nodes 215. Alternatively, some or all storage nodes 215 may only have information about a subset of storage nodes 215.

Using a parity data protection scheme, data is spread across multiple RAIN nodes 105 and/or multiple RAIN systems as described above. In event of a failure of one RAIN element 215, RAIN node 105, or RAIN system, high availability and high reliability functionality can be restored by accessing an alternate RAIN node 105 or RAIN system. At one level, this reduces the criticality of a failure so that it can be addressed days, weeks, or months after the failure without affecting system performance. At another level, it is contemplated that failures may never need to be addressed. In other words, a failed disk might never be used or repaired. This eliminates the need to deploy technical resources to distant locations. In theory, a RAIN node 105 can be set up and allowed to run for its entire lifetime without maintenance.

RAIN nodes 105 desirably implement a "heartbeat" process that informs other RAIN nodes or storage management processes of their existence and their state of operation. For example, when a RAIN node 105 is attached to a network 214 or 215, the heartbeat message indicates that the RAIN node 105 is available, and notifies of its available storage. The RAIN node 105 can report disk failures that require parity operations. Loss of the heartbeat might result in reconstruction of an entire node at an alternate node. In a particular implementation, the heartbeat message is unicast to a single management node, or multicast or broadcast to a plurality of management nodes periodically or intermittently. The broadcast may be scheduled at regular or irregular intervals, or may occur on a pseudorandom schedule. The heartbeat may also be derived by the presence of other traffic from or related to a node. The heartbeat message includes information such as the network address of the RAIN node 105, storage capacity, state information, maintenance information and the like.

Through this exchange of state information and the heartbeat message, nodes 105 (and/or SAM processes) become aware of other nodes 105. This enables nodes 105 to be seamlessly added and removed from the system. As nodes 105 are added and removed, the parity operations in accordance with the present invention adapt to use newly added nodes by allocating storage space in the nodes for data/parity stripes. As nodes are removed, the parity operations in accordance with the present invention reconstruct data/parity information stored on the removed node and re-establish data protection with other available nodes 105.

Figure 5:
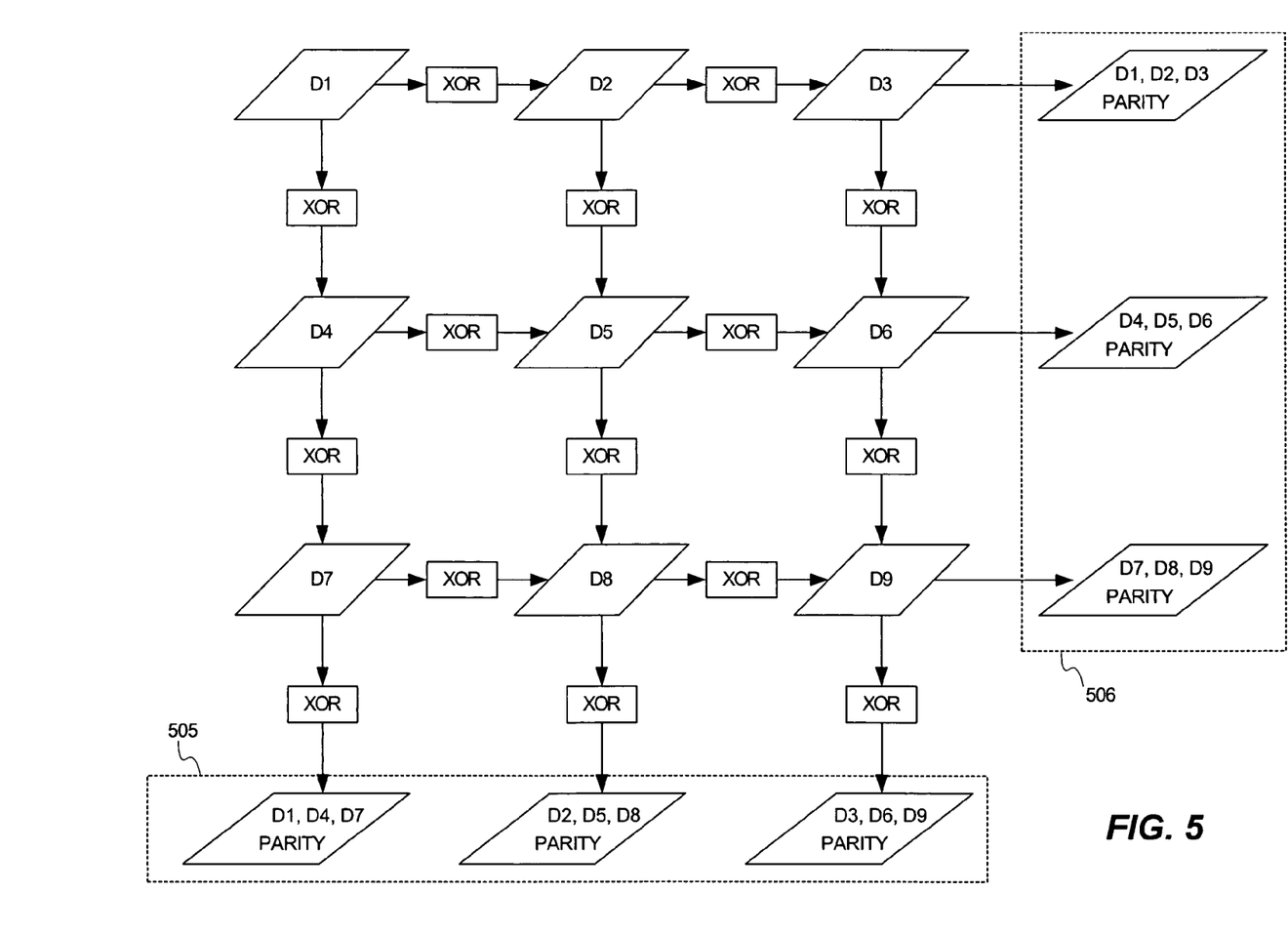
FIG. 5 illustrates a logical implementation of a first exemplary parity embodiment.

FIG. 5 illustrates a logical implementation of a first exemplary parity embodiment in accordance with the present invention. Specifically, FIG. 5 shows a 3×3 uniform parity scheme. In FIG. 5, nine units of data (D1–D9) are held in six unrelated parity groups 505 and 506. The units of data D1–D9 and parity are preferably stored in independent nodes 105, but may be stored in separate locations of a single node 105 with predicable affects on availability and reliability. In this example, the loss of any two units of data or parity would allow recover of all original data and parity.

Figure 6:
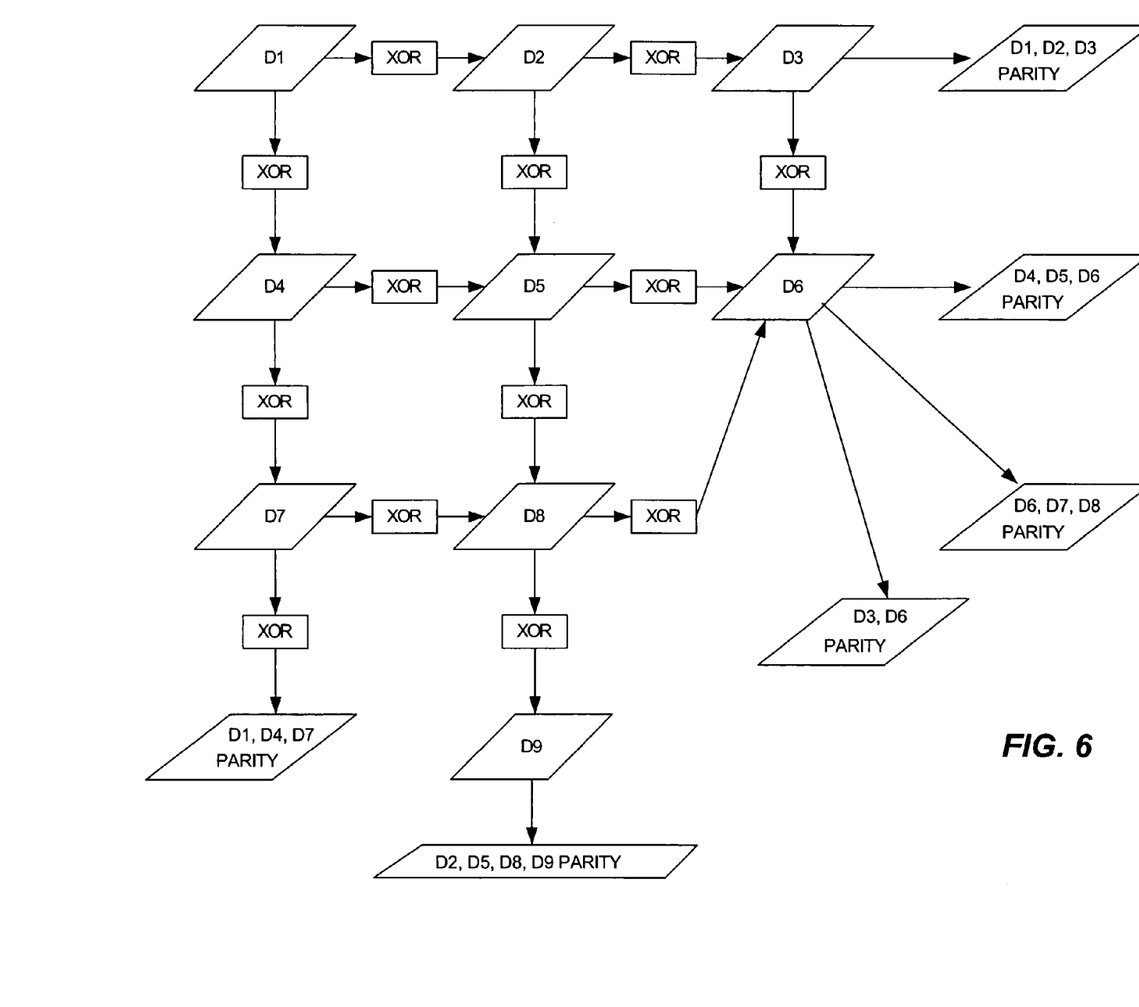
FIG. 6 illustrates a logical implementation of a second exemplary parity embodiment.

FIG. 6 illustrates a logical implementation of a second exemplary parity embodiment demonstrating a non-uniform data parity scheme. In FIG. 6, the nine different units of data (D1–D9) are in different parity groups. All of the data as configured below is protected against the loss of a single unit of data or parity. Data units D1–D8 are protected against loss of two units of data or parity, while data element D9 is protected only against a single unit loss.

Conventional parity systems provide a single level of parity protection to all data units stored therein. While convenient to implement, this "one size fits all" approach provides little flexibility to meet customer needs. In contrast, by using the non-uniform parity capability of the present invention, data unit D9 can be stored at lower cost while the same system provides higher levels of protection as needed. FIG. 5 and FIG. 6 show only two dimensional parity and it should be understood that much greater variety in protection levels is available with n-dimensional parity schemes.

Figure 7:
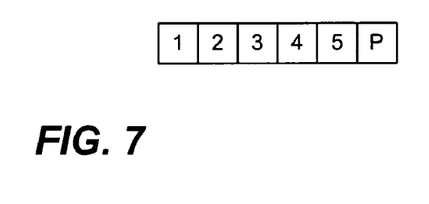
FIG. 7-FIG. 9 illustrate multiple parity dimensions.
Figure 8:
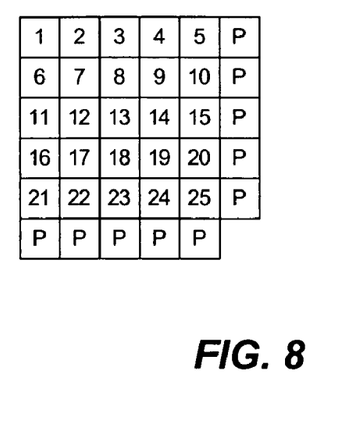
Figure 9:
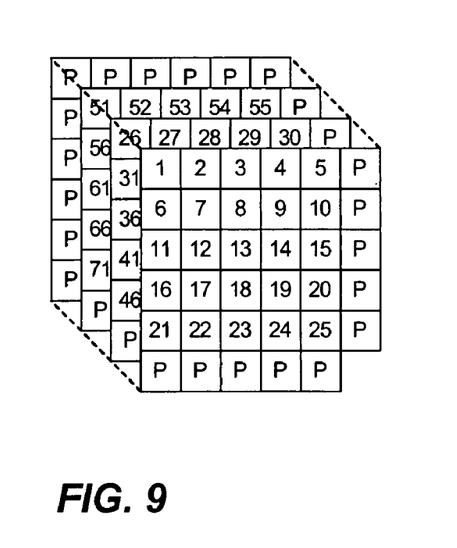

FIG. 7–FIG. 9 illustrate multiple parity dimensions in accordance with the present invention. While particular advantages are achieved with higher order parity, it should be understood that the present invention can be configured to provide lower order parity such as one-dimensional (FIG. 7) and two-dimensional (FIG. 8). Significantly, some data sets can be protected using the schemes shown in FIG. 7 and FIG. 8 while others use higher order parity such as three-dimensional parity (FIG. 9) at the same time, using the same hardware and software resources.

In other words, any given set of SAM processes can take a first data set and allocate space within a number of nodes 105 to provide single dimensional parity for that first data set. The same set of SAM processes can take a second data set and allocate space within the number of nodes 105, or a different set of nodes 105, to provide three dimensional, four dimensional, or any desired order parity for the second data set. Further, the number of dimensions of parity associated with a given data set can be increased or decreased, as can the size of the parity group itself.

Figure 10:
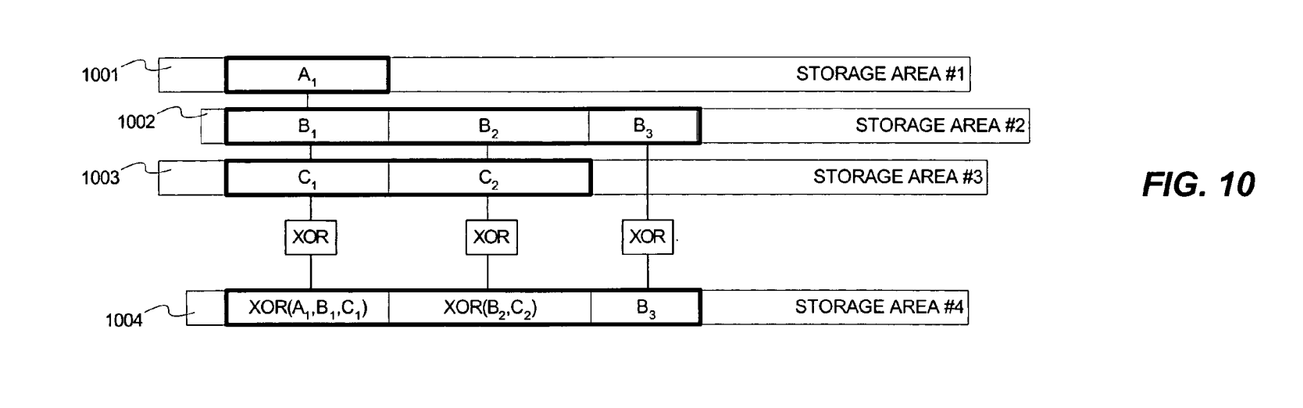
FIG. 10 shows storage data structures in accordance with the present invention.

FIG. 10 shows storage data structures in accordance with the present invention. FIG. 10 depicts four storage areas each containing one stripe. Stripes A, B and C in storage areas 1001–1103, respectively, are data stripes. Storage area 1004 holds the parity stripe holding XOR'ed images of A, B and C. The configuration of FIG. 10 shows how a single dimension of parity is constructed.

The XOR operation does not require all objects to have the same length. For those portions of A, B, or C that do not overlap in the parity stripe, the value is the XOR of those stripes that do. Another way to think about this is to imagine that each stripe A, B and C are padded to the longest length with zeros, so the non-overlapping regions are calculated as XOR(A1,B1,C1); XOR(0,B2,C2)=XOR(B2,C2); and XOR(0,B3,0)=B3.

Figures 11, 12, 13:
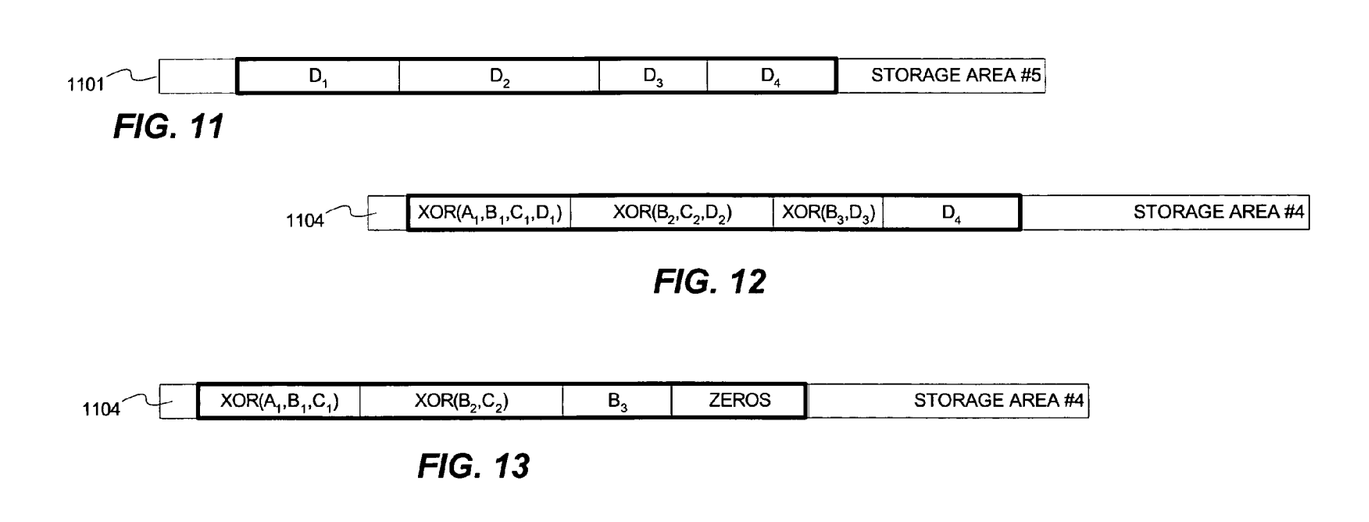
FIG. 11 through FIG. 13 shows data structures resulting from dynamically modifying parity groups in accordance with the present invention.

FIG. 11 through FIG. 13 illustrates the addition of another storage area 1101 (shown in FIG. 11) to the system described in FIG. 10 and a stripe inside it is allocated to hold D. D can be added to the parity stripe in storage area 1104 by an XOR operation as suggested in the altered parity information in storage area 1104 shown in FIG. 12. In order perform this operation, each unit of parity information is lengthened as needed to accommodate D's greater length. Note also that the XOR operation to place D into the parity stripe does not require reading A, B and C again because the existing values in P can be used. For example, the first segment of the parity stripe contains XOR(A1,B1,C1), let's call that value P1. So to add in D1, we need only perform XOR(P1,D1) which is the same as XOR(XOR(A1,B1,C1), D1) which is equivalent to XOR(A1,B1,C1,D1). This greatly lessens the administrative overhead in managing parity groups and changing parity group membership.

After D joins the parity stripe, the parity stripe is as shown in FIG. 12. Suppose further that this new storage area 1101 is to be removed from the system. Before that happens the values associated with the D data set must be removed from the parity stripe it just joined. This is accomplished by performing the same operation used in adding it into parity, namely XOR'ing D's values into the existing parity image (as shown in FIG. 12). This is because XOR(D1,XOR(P1, D1) )=P1. After D has been XOR'ed out of the parity stripe, storage area 1104 (shown in FIG. 13) looks like a longer version of it's former self (shown in FIG. 10), with extra zeros (recall that XOR(D4,D4)=0) at the end from the lengthening operation above. The parity stripe shown in FIG. 13 could then be reduced in length to remove the zeros if desired.

Figure 14:
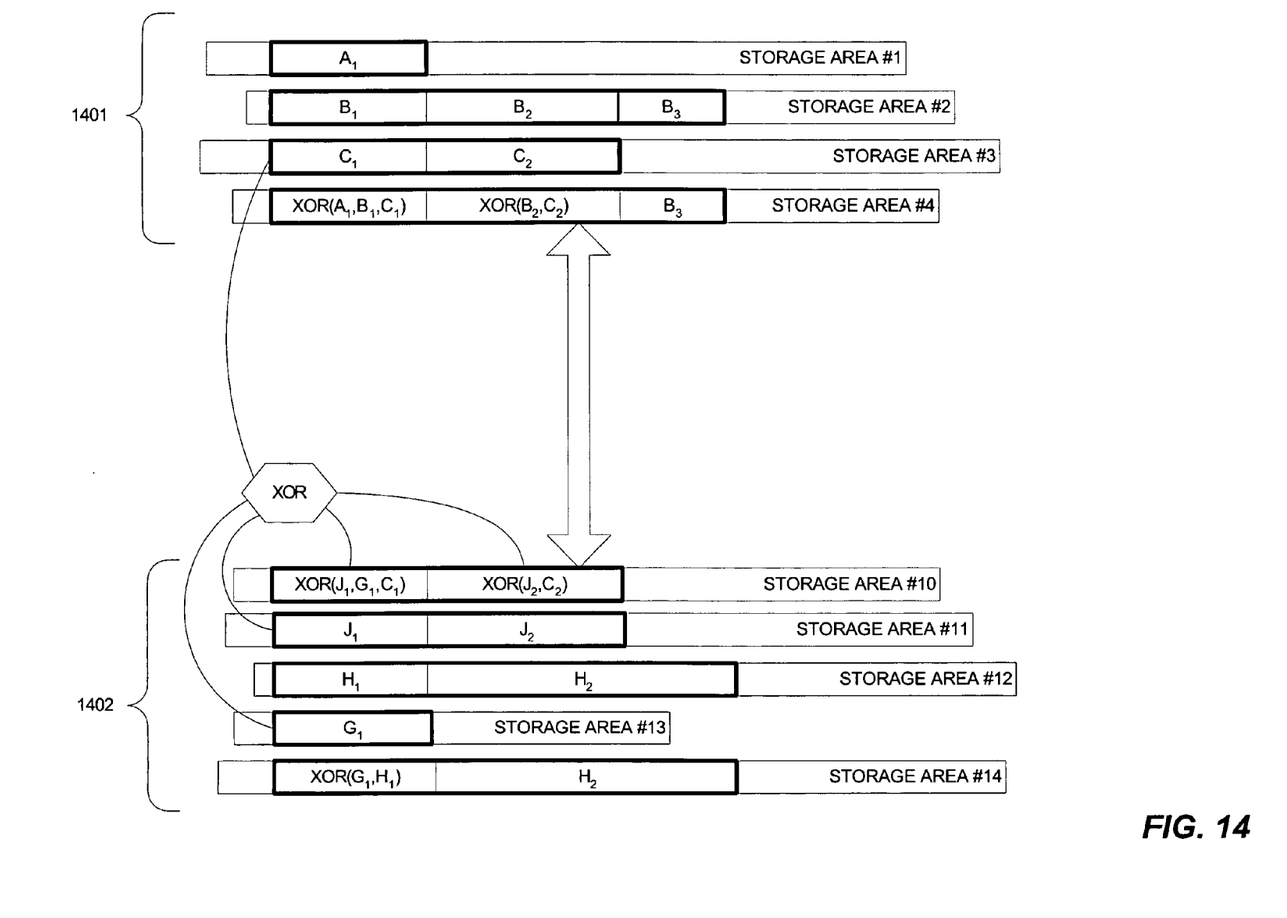
FIG. 14 shows data reconstruction in accordance with the present invention.

FIG. 14 shows data reconstruction in accordance with the present invention. FIG. 14 depicts two separate storage groups 1401 and 1402 with a parity stripe in 1402 that contains data from 1401. Parity organized in such a way creates a means to access data at a distant location using the local data and parity. For example, the parity stripe in storage area 10 contains data stripe C from distant group 1401 XOR'ed together with data stripes G and J from the local group 1402.

If the communications channel 1403 between 1401 and 1402 becomes so congested as to make timely access to data untenable, the stripes at 1401 would normally be effectively inaccessible at 1402 and the vice versa. Because, however, storage at 1402 has a parity stripe that contains an image of C XOR'ed together with parity members, namely Q, J and G, then it is possible to derive C from storage group 1402 alone. This is because XOR(Q,J,G) equals C. Organizing parity stripes using this property can provide alternative paths to data as an expanded form of fault tolerance and a way to enhance system performance.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A data storage management system comprising:
   a data communication network;
   a plurality of storage locations, wherein each storage location is coupled to communicate over the network;
   a storage management control mechanism coupled to the network and configured to receive a storage request associated with a data set and determine a degree of fault tolerance for the data set;
   means for identifying at least one parity group within the storage locations that provides the determined deqree of fault tolerance, wherein the identified parity group comprises a non-intersecting parity group where no two members of a single parity group reside on a same physical device; and
   a write mechanism in the storace management control mechanism capable of writing the data set to at least one of the identified parity groups.

2. A data storage management system for storing a plurality of data sets, the system comprising:
   a storage management control mechanism configured to receive a storage request associated with a data set;
   a plurality of parity groups wherein each parity group comprises a logical combination of the plurality of data sets;
   wherein levels of parity protection of the plurality of parity groups varies for arbitrarily small subsets of data within the plurality of data sets.

3. The data storage mechanism of claim 2 wherein at least one of the plurality of parity groups is dynamically configurable by altering which of the plurality of data sets are members of the at least one dynamically configurable parity group.

4. The data storage mechanism of claim 2 wherein each of plurality of data sets is stored in a physical storage area that is separate from the physical storage area in which the parity group is defined.

5. The data storage mechanism of claim 2 wherein the storage management control mechanism dynamically modifies at least one parity group definition while the plurality of data sets remain available.

\* \* \* \* \*